Patented Dec. 4, 1945

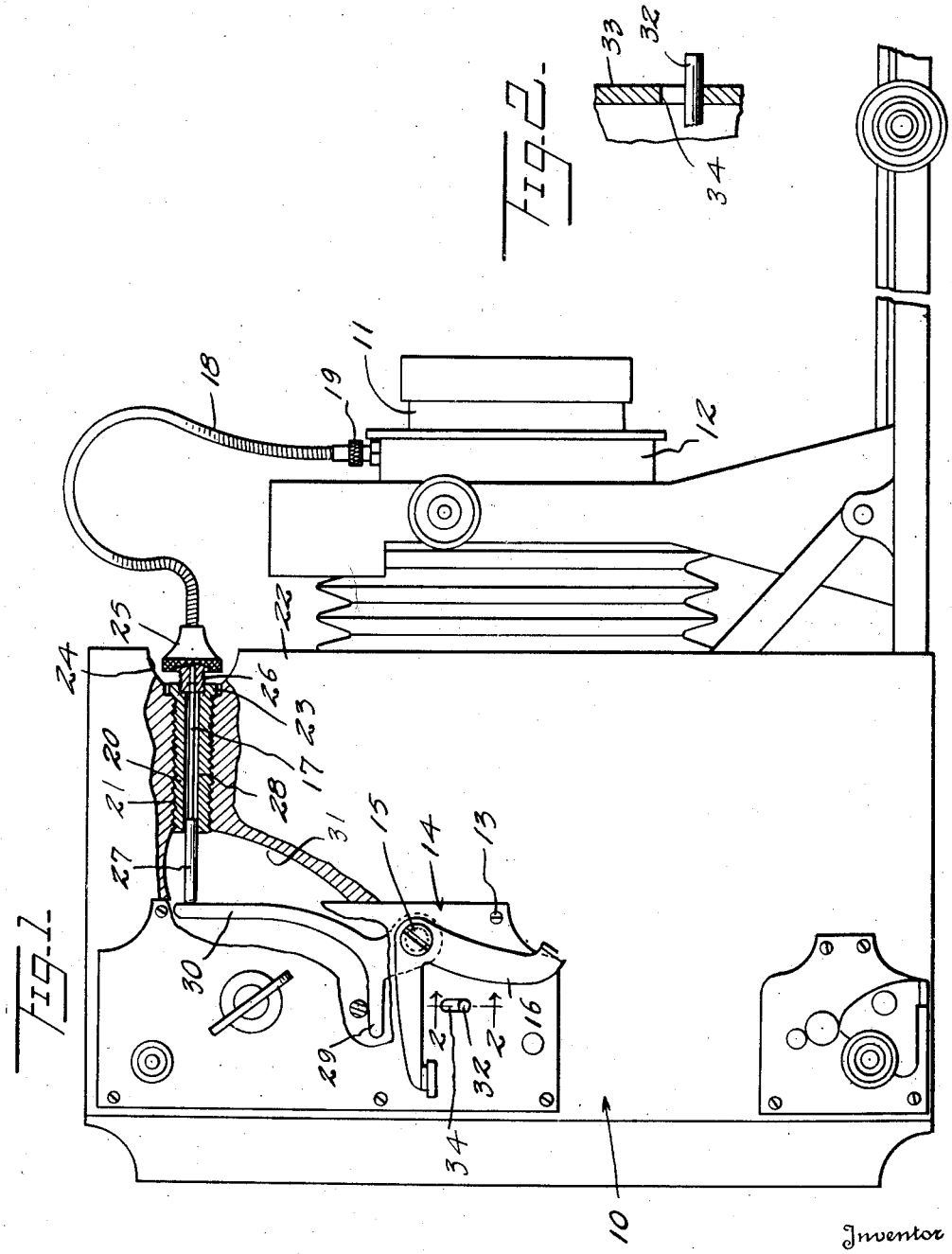

2,390,464

UNITED STATES PATENT OFFICE 2,390,464

BUILT-IN LENS CAPPING MECHANISM

Walter O. Runcie, Lima, Peru

Application November 18, 1944, Serial No. 564,099

3 Claims. (Cl. 95—53)

This invention relates to lens capping devices, and is an improvement over the structure embodied in Patent No. 2,354,145, issued July 18, 1944.

An object of this invention is to provide an improved lens capping mechanism which is built into the housing for a camera and which will prevent unintentional fogging of the film while the focal plane shutter curtain is being wound from one aperture to another, or in releasing the curtain in order to change speeds, without having to first insert the slide in the plate or film holder, or by placing a cap on the lens.

Another object of this invention is to provide a shutter release mechanism which can be easily combined with the present structure of the camera, and which will permit selective operation of either the focal plane shutter or the lens shutter, the operative connection between the two mechanisms being readily separated so that each shutter release may be independently operated.

To the foregoing objects, and others which may hereinafter more fully appear, the invention consists of the novel construction, combination and arrangement of parts, as will be more specifically refered to and illustrated in the accompanying drawing, but it is to be understood that changes, variations, and modifications may be resorted to which fall within the scope of the invention as claimed.

In the drawing:

Figure 1 is a detail side elevation partly broken away and in section of a camera embodying this invention.

Figure 2 is a fragmentary sectional view taken on the line 2—2 of Figure 1.

Referring to the drawing, the numeral 10 designates generally a camera housing embodying a lens construction 11 and having associated with the lens construction 11 a lens shutter construction 12. The shutter construction 12 is of conventional construction as is the lens construction 11. The camera herein disclosed is of the Graflex Speed Graphic type and includes a focal plane shutter which has correlated therewith a focal plane shutter release mechanism generally designated as 14. The shutter release mechanism 14 is of conventional construction, being secured by fastening members 13 to one side of the housing 10.

The focal plane shutter release mechanism includes a rockable shaft 15, having a release lever 16 secured thereto and disposed on the exterior of the housing for the release mechanism 14. The lens shutter mechanism 12 includes a shutter release Bowden wire 17, which is slidable in a sheath 18 secured by coupling means 19 to the housing for the shutter mechanism 12.

In order to provide for simultaneous release of both the focal plane shutter and the lens shutter, I have provided a bushing 20 which is threaded as at 21 into a side wall 22 of the housing 10. The bushing 20 includes a flanged outer end 23 and preferably the wall 22 is cut out as at 24 so that the flanged outer end 23 of the bushing 20 will be inset or counter-sunk in the outer edge of the side wall 22. The sheath 18 at its free end is provided with a coupling member 25, and the coupling member 25 includes a threaded stud 26 which is threaded interiorly of the outer end of the bushing 20. The threaded stud 26 provides a means whereby the lens shutter release operating member 17 may be easily and quickly uncoupled and removed from bushing 20, so that the lens shutter mechanism may be independently operated with respect to the focal plane shutter.

The Bowden wire 17 has secured to the free end thereof an operating head 27 which is slidable in the bore 28 of bushing 20, and is normally partly extended from the inner end of bushing 20 as shown in Figure 1. It will be understood that the shutter release mechanism for the lens is spring pressed to an inoperative position, so that operating head 27 will normally be partly extended from bushing 20.

The focal plane shutter release mechanism includes an arm or finger 29, which is secured to the shaft 15 and in order to provide for simultaneous release of the lens shutter mechanism when shaft 15 is rocked by movement of lever 16 to release the focal plane shutter, I have provided an elongated finger 30 which may be formed integral with finger 29 and which extends upwardly to a position confronting the head 27. The spring means for the lens shutter release will normally hold head 27 into contact with the upper end portion of finger 30. The side wall 22 of the camera housing is formed with a cutout or recess 31 within which finger 30 is adapted to loosely engage when the latter is rocked under the rocking of lever 16.

The focal plane shutter release mechanism may be independently operated so that the curtain apertures of the shutter may be changed by means of a pin 32 which is connected to the escapement yoke of the focal plane shutter release mechanism. The pin 32 forms a part of a conventional release mechanism such as is shown in the prior Patent No. 2,282,291, dated May 5, 1942, and extends outwardly of the outer wall 33 of the focal plane shutter release mechanism and is vertically slidable in an elongated slot 34 formed in wall 33. In this manner the focal plane shutter release mechanism may be independently operated without disconnecting connector 25 from bushing 20 and removing operating head 27 from engagement with finger 30.

In the use and operation of this camera connector 25 will normally be threaded into the outer end of bushing 20 and head 27 carried by Bowden wire 17 will normally be in contact with finger 30 forming an extension of the focal plane shutter release mechanism. The two shutter release mechanisms are simultaneously operated by merely rocking lever 16 which forms a part of the present construction of a conventional focal plane escapement construction. If it is desired to change the curtain aperture of the focal plane mechanism without opening of the lens shutter, pin 32 may be raised thereby releasing the escapement mechanism of the focal plane shutter release. This change of the curtain aperture is effected with the lens shutter in closed position, so that there will not be any fogging of the film or plate, and it will not be necessary to place a cap on the outer end of the lens as has heretofore been the practice.

In the event it is desired to operate the lens shutter mechanism independently of the focal plane shutter, coupling 25 is unscrewed from the outer end of bushing 20 and operating head 27 is withdrawn from the bore 28 of the bushing. With operating head 27 removed from bushing 20, the operating head may be pushed inwardly in the normal manner so as to effect operation of the lens shutter mechanism.

The combination hereinbefore described has been designed as a built-in feature which may be built into the camera at the factory. The only important change necessary in the present construction is the substitution of the integral fingers 29 and 30 for the present construction which includes only the one finger 29 and a long pin 32 for the present pin forming part of the escapement mechanism.

What is claimed is:

1. In a camera having a lens shutter release mechanism and a focal plane shutter release mechanism, a flexible operator for said lens shutter release mechanism, a sheath about said operator and terminating at one end inwardly from the adjacent end of said operator, a guide slidably supporting the extended end of said operator and threadably disposed in a wall of the camera, means removably securing said sheath to said guide a head fixed to the extended end of said operator and slidably engaging said guide, said focal plane shutter release mechanism including a rockable release shaft, an operating lever fixed on said shaft, and a finger also fixed on said shaft and engageable with said head whereby rocking of said shaft will effect operation of said lens shutter release mechanism simultaneously with operation of said focal plane shutter release mechanism.

2. In a camera including a housing, a lens shutter release mechanism, and a focal plane shutter release mechanism, means whereby both release mechanisms may be operated simultaneously, said means including a tubular bushing embedded in a wall of said housing, a flexible operator for said lens shutter release mechanism, a head carried by said operator slidably engaging said bushing, a sheath about said operator, a connector on one end of said sheath threadably engaging the outer end of said bushing to thereby removably hold said operator relative to said bushing, said focal plane shutter release mechanism including release shaft, a lever carried by said shaft whereby the latter may be manually rocked, and a finger fixed to said shaft confronting said head whereby rocking of said release shaft will effect release of said lens shutter release mechanism.

3. In a camera as set forth in claim 2 wherein said wall of said housing is formed with a cut-out in one edge thereof and said bushing includes a flange at its outer end positioned in said cut-out, said connector also engaging within said cut-out.

WALTER O. RUNCIE.